United States Patent [19]
Vogt et al.

[11] 3,753,486
[45] Aug. 21, 1973

[54] APPARATUS FOR LOADING AN AUTOMATIC FILM PROCESSING UNIT

[75] Inventors: Horst Dieter Vogt; Oskar Schnellmann, both of Zurich, Switzerland

[73] Assignee: Gretag Aktiengesellschaft, Regensdorf, Switzerland

[22] Filed: Sept. 30, 1971

[21] Appl. No.: 185,249

[30] Foreign Application Priority Data
Oct. 2, 1970 Switzerland.................... 14626/70

[52] U.S. Cl..................... 198/131, 221/11, 221/81, 221/105, 221/122, 253/116
[51] Int. Cl............................................. B65g 59/00
[58] Field of Search.................... 198/131, DIG. 14, 198/209; 221/11, 79, 81, 105, 122; 353/111, 112, 113, 114, 115, 116, 117

[56] References Cited
UNITED STATES PATENTS
| | | | |
|---|---|---|---|
| 2,846,832 | 8/1958 | Larsen et al. | 198/209 |
| 2,497,718 | 2/1950 | Earley et al. | 221/11 |
| 3,059,360 | 10/1962 | Krauskopf | 353/116 |

Primary Examiner—Richard E. Aegerter
Assistant Examiner—Hadd S. Lane
Attorney—Pierce et al.

[57] ABSTRACT

Apparatus for loading an automatic film processing unit comprises a rotatable turret formed with guideways for holding magazines for axial movement relative to the turret. Each magazine comprises a stack of compartments each of which is adapted to accommodate a standard film container in a predetermined position. The turret is rotatable so that each magazine is successively in a processing station in which a shifting means engages and axially shifts the magazine stepwise so that each compartment is successively adjacent a processing position, the magazines not in a processing station being engaged by means preventing axial movement. The magazines may be formed with compartments selectively adjustable to all hold either 126-type film cassettes or 135-type film cartridges, and means may be provided so that once a magazine holding one type of film has been placed on the turret, only magazines also holding that type of film can be positioned on the turret.

13 Claims, 7 Drawing Figures

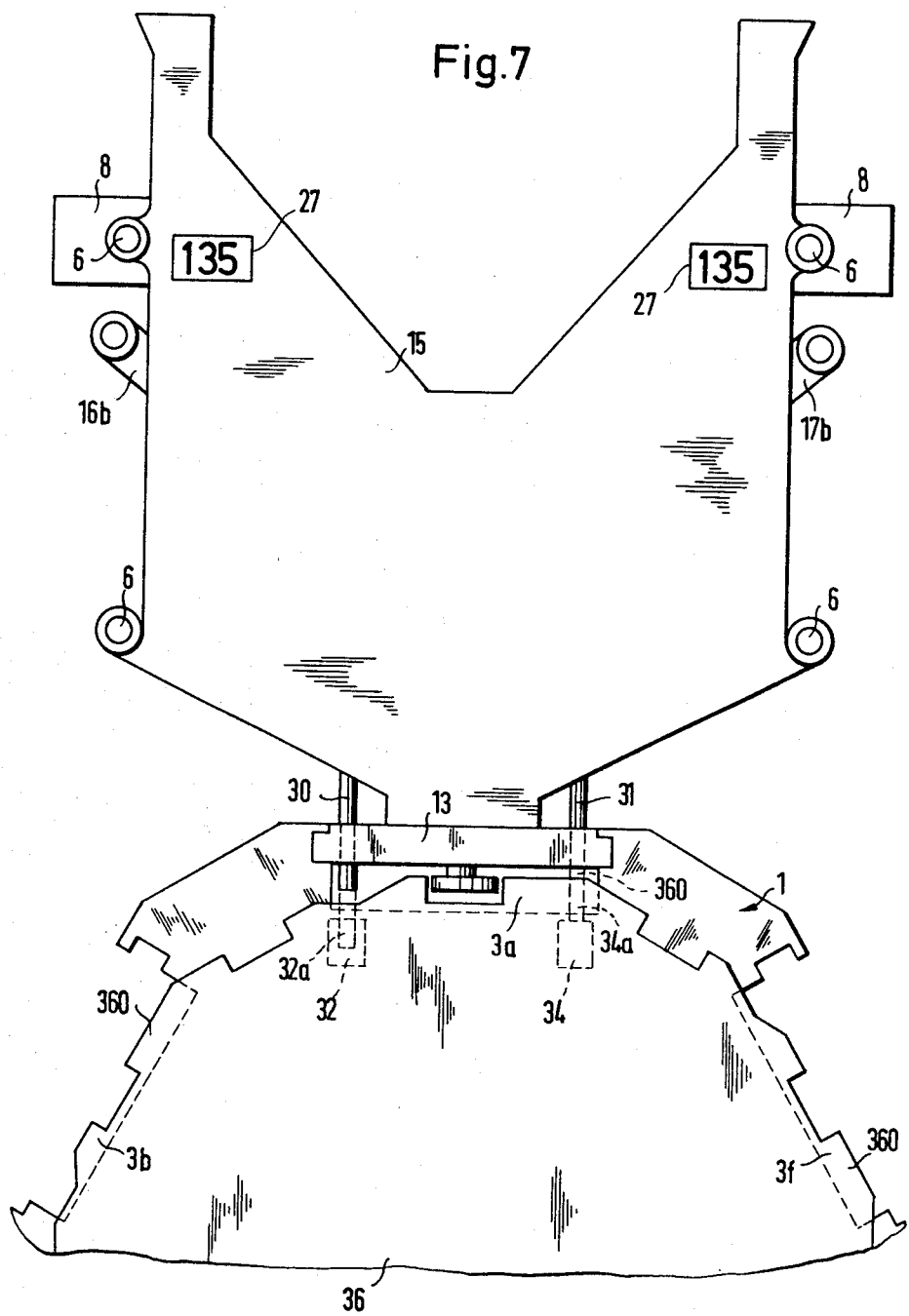

APPARATUS FOR LOADING AN AUTOMATIC FILM PROCESSING UNIT

BACKGROUND OF THE INVENTION

This invention relates to apparatus for loading automatic film processing units.

In known film processing units the films and the associated despatch containers are manually introduced singly in succession and are processed immediately after being introduced. The main disadvantage of this is that an operator must always be present and his working tempo is governed by the processing speed of the equipment, and there may be relatively long intervals between the various short working phases, although such intervals are too short to be used for other jobs. Therefore the operator must always be by the machine yet he does not have a full work load. Since automatic processing machines must receive the material for processing in a very accurately positioned relationship, another disadvantage is complicated and time-consuming manual positioning. A third disadvantage is the risk when processing different types of film (126 or 135), that the machine may not be correctly set to the correct film type by the operator, and this may cause a serious malfunction.

It is an object of the invention to provide apparatus for loading a film processing unit which allows an operator to work at his own optimum speed.

It is a further object of the invention to provide apparatus which prevents an operator from accidentally loading a film processing unit with the wrong type of film.

The invention provides apparatus for loading an automatic film processing unit, comprising:

a rotatable turret formed with a plurality of axially extending guideways;

a plurality of magazines, each adapted to be held in a respective one of said guideways for axial movement relative to the turret, and each magazine comprising a stack of compartments which are each adapted to hold a standard film container in a predetermined position;

one or more processing stations adjacent the turret;

drive means for stepwise rotation of the turret so that each guideway in turn and the magazine therein is in the or one of the processing stations at at least one angular position of the turret;

shifting means at the or each processing station for automatically engaging and stepwise shifting a magazine in that processing station axially relative to the turret so that successively each compartment of the magazine is adjacent a predetermined processing position; and means for engaging and preventing axial movement of magazines which are not in the or one of the processing stations.

In a preferred embodiment of the invention each magazine compartment is formed with holding means which can be selectively adjusted to hold only one or other of a first and second type of standard film container, e.g. 126-type cassettes or 135-type cartridges. The holding means of each compartment of the magazine are preferably interconnected so that the compartments of a magazine can only either all hold a container of said first type or all hold one of said second type. Preferably also the magazine comprises a container-type indicating means which can be set by the holding means in dependence on the type of film container being held, and the turret comprises blocking means adapted to cooperate with the container-type indicating means, which blocking means can be selectively set to prevent the insertion of magazines holding one or other type of film container.

In the apparatus according to the invention, a large number of magazines can be kept in stock and be changed as required for already emptied magazines on the turret. The introduction of the films and their associated despatch bags into the magazines can be timed so as to be carried out at the optimum tempo.

BRIEF DESCRIPTION OF THE DRAWINGS

Specific embodiments of the invention will be described hereinafter, by way of example, with reference to the accompanying drawings wherein:

FIG. 7 is a detail of a plan view similar to that of FIG. 1 showing a second embodiment of the invention using a magazine as shown in FIG. 6.

GENERAL DESCRIPTION OF THE PREFERRED EMBODIMENTS

Figure 1:
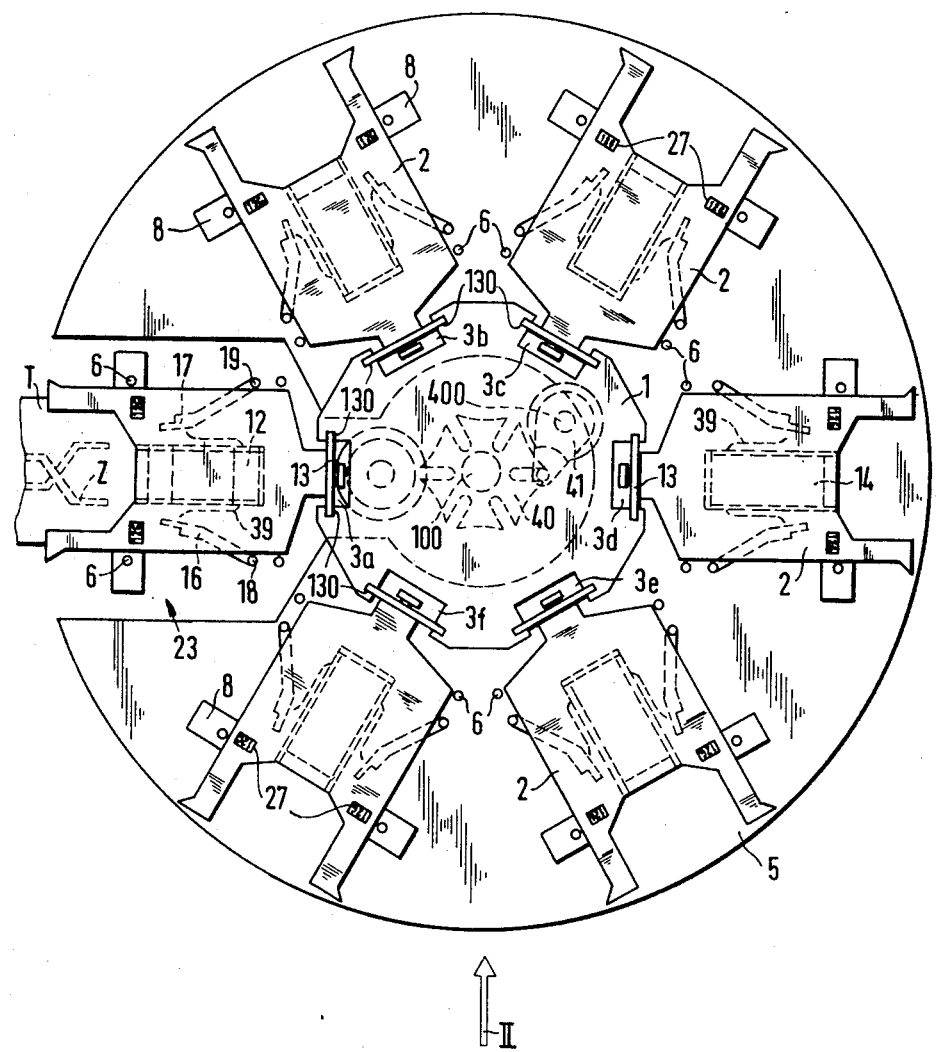
FIG. 1 is a general plan view of a first embodiment of the invention.
Figure 2:
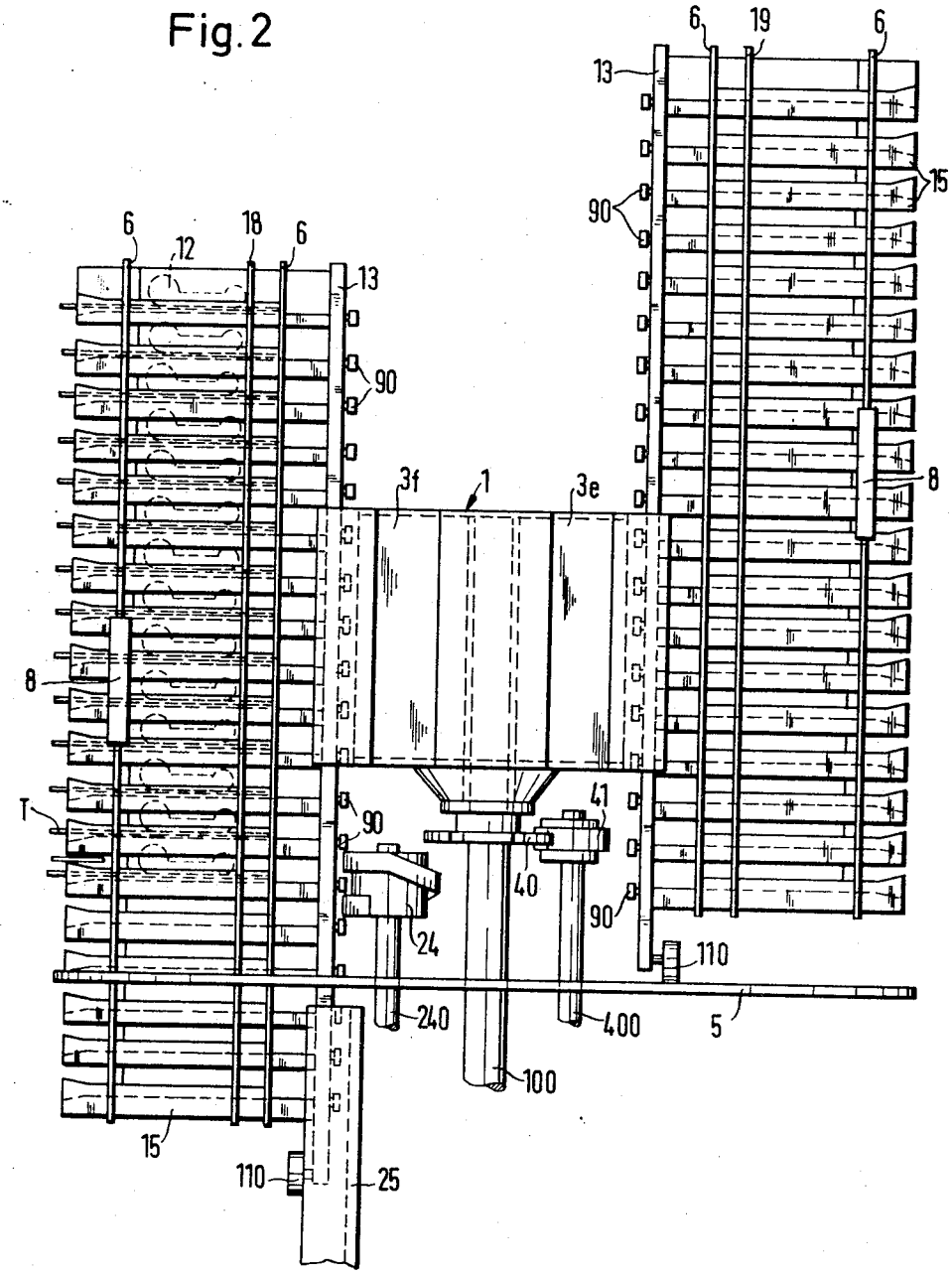
FIG. 2 is a side elevation in the direction of the arrow II in FIG. 1.
Figure 3:
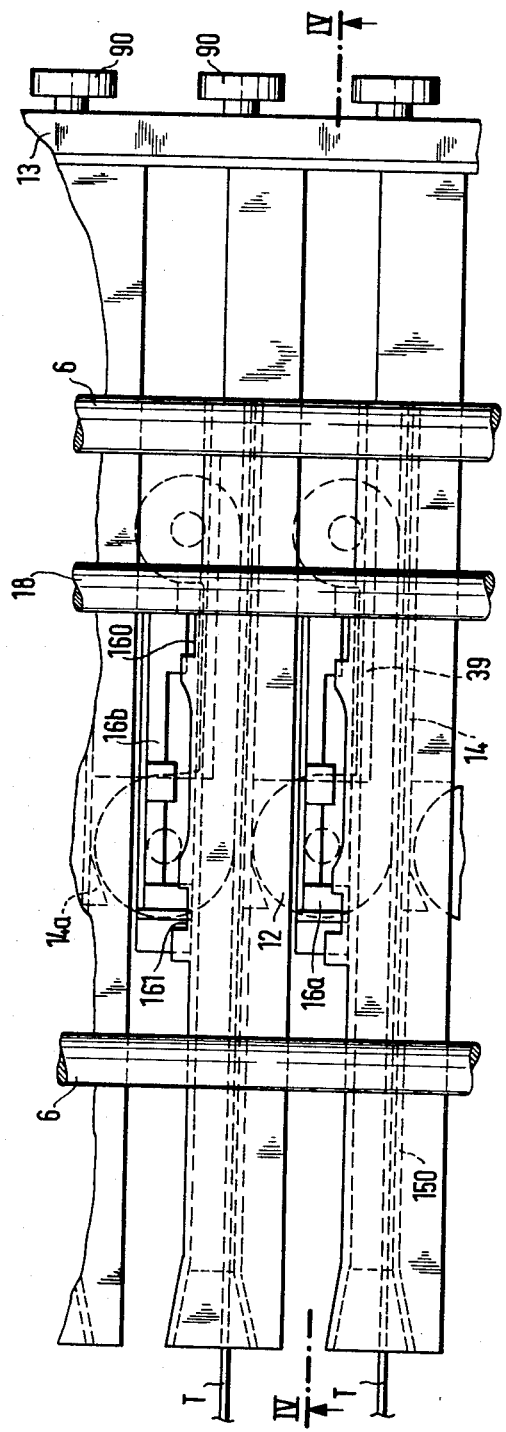
FIG. 3 is a detail of a magazine of the embodiment shown in FIG. 1, on an enlarged scale.

Referring to FIGS. 1 and 2, an embodiment of the invention is shown comprising a turret 1 which is mounted on a rotatable spindle which is stepwise rotatable on shaft 400 through a given angle by means of a six slot external Geneva wheel drive 40/41. In order to accommodate six magazines 2 simultaneously, the turret 1 is provided at its periphery with vertical and axially extending guideways 3a – 3f having a pair of lateral grooves 130. The magazines 2 are all of identical construction and each comprises a plate 13, whose longitudinal edges fit into the pairs of grooves 130 in the guideways 3a – 3f. A magazine is shown inserted in each guideway 3a – 3f in FIG. 1; in FIG. 2, for the sake of clarity, only the two guideways 3a – 3f are shown with magazines. The magazines 2 are freely slidable in the guideways 3a – 3f for axial movement relative to the turret and are secured against slipping out at the bottom by means of a fixed supporting plate 5, on which each magazine bears by means of a roller 110. The supporting plate 5 has a cut out portion 23, and each of the magazines 2 can be shifted through said cutout portion; in the position shown, the magazine in the passage 3a has been shifted through. At the cut out portion 23, a shifting means in the form of a wormwheel 24 which can be reversibly driven via a shaft 240, is so disposed as to couple automatically with each magazine 2 which has been rotated into the cut out portion. To this end, each magazine 2 is provided with a series of free-running rollers 90 which fit in the wormwheel 24. Each magazine 2 in the cut out portion couples with the wormwheel 24 via a series of rollers 90 and is secured against falling through the cut out portion by engagement with the wormwheel. Stepwise rotation of the wormwheel 24 in one direction causes the coupled magazine 2 to be shifted stepwise downwardly through the cut out portion 23 and rotation of the wormwheel in the opposite direction causes it to be shifted back up. This operation can be performed for all the other magazines 2 after rotation of the turret 1 through 60° in each case, and the cut out portion thus defines a processing station in which each guideway can be located successively. A control and drive mechanism which is known per se and therefore not illustrated is provided for rotating the turret. The Geneva wheel drive 40/41 is connected to said mechanism, and the wormwheel 24 is also connected thereto via the shaft 240. An additional fixed guide 25 is provided below the cut out portion 23 for the magazine being shifted.

The magazines are built up to form stacks of compartments from identical units 15, which are secured to the strip-shaped plate 13 at one end at equal intervals, and are held together at the sides by four struts 6. One of these struts 6 is provided with a handle 8.

Referring to FIGS. 3 to 7, each of the units 15 consists of a part 150, the top of which is constructed as a shelf for supporting a bag T for a film container. From the undersides of each of these parts 150, a holder 39 — which is open in the direction of insertion — for locating a film cassette 12 of the type 126 extends just as far as the part 150 of the next structural unit. The parts 150 of the structural units 15 have two slits which extend in the direction of insertion and which are disposed above and below the holders 39, the strips situated between these slits forming spring tongues 14. The free ends of these spring tongues 14 are provided with wedge-shaped projections 14a. Alternatively they may be bent downwardly in the form of hooks. The arrangement is such that the wedge-shaped projections 14a engage over type 126 film cassettes inserted into the holders 39, so that said cassettes are adequately secured against unintentionally falling out during handling of the magazines. The projections 14a also serve to define the position of the take-up spool of the cassette.

Figure 4:
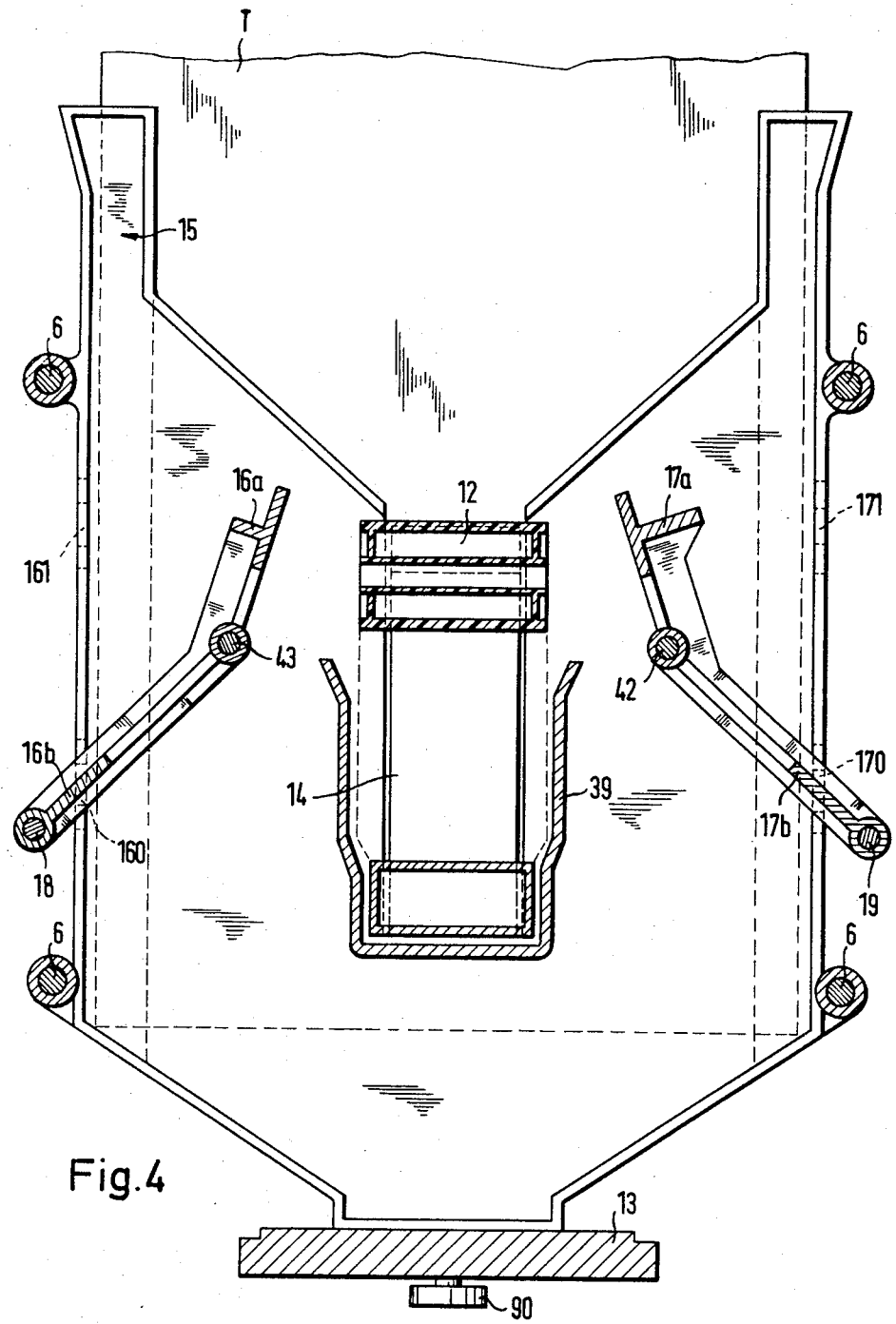
FIG. 4 is a section through the magazine of FIG. 1, on the line IV — IV in FIG. 3.
Figure 5:
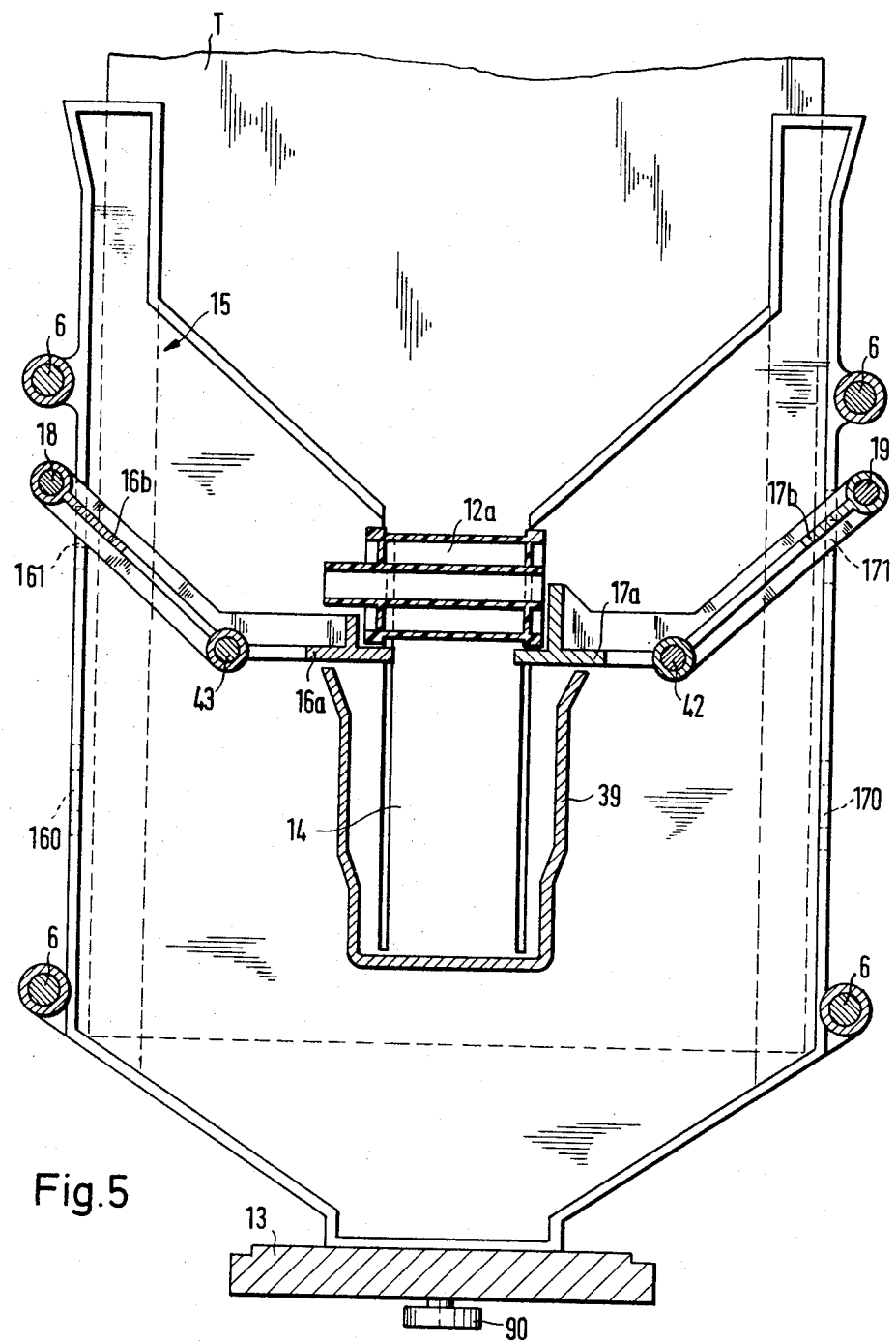
FIG. 5 shows the magazine of FIG. 4 in a second operating position.

The holders 39 are so constructed that they retain only type 126 film cassettes and the latter can be inserted only in a predetermined position. Preferably, and as will be clearest from FIGS. 4 to 7, each unit 15 and hence each magazine compartment is provided with a second holder for type 135 film cartridges. Each of these holders is formed by a pair of two-armed levers 16/17. Each of the levers 16, 17 respectively is pivotable about an axis 41 and 42 respectively and can be set in one of two positions. In one position, which is shown in FIG. 4, the two levers 16 and 17 have been pivoted outwardly by their inwardly pointing arms 16a and 17a, and have been engaged by their outwardly pointing arms 16b and 17b in recesses 160 and 170 respectively in the unit 15. In this position, the two levers 16 and 17 allow 126 cassetes to be introduced into the holder 39. In the other position, which is shown in FIG. 5, the inwardly pointing arms 16a and 17a of the pair of levers 16/17 block insertion of 126 cassettes into the holder 39. The ends of the two lever arms 16a and 17a are so shaped that in this position, which is determined by engagement of the lever arms 16b and 17b in recesses 161 and 171 respectively, they cooperate with the spring tongues 14 to form a holder for type 135 film cartridges 12a. The ends of all the lever arms 16b and 17b extending from all the structural units 15 of every magazine 2 are interconnected respectively by means of a rod 18, 19, so that all the holders of the magazine are adjustable simultaneously. The adjustment is shown on a scale 27 (FIG. 1) in the top end plate of each magazine; in FIG. 1, this scale indicates that type 126 film cassette is loaded.

Figure 6:
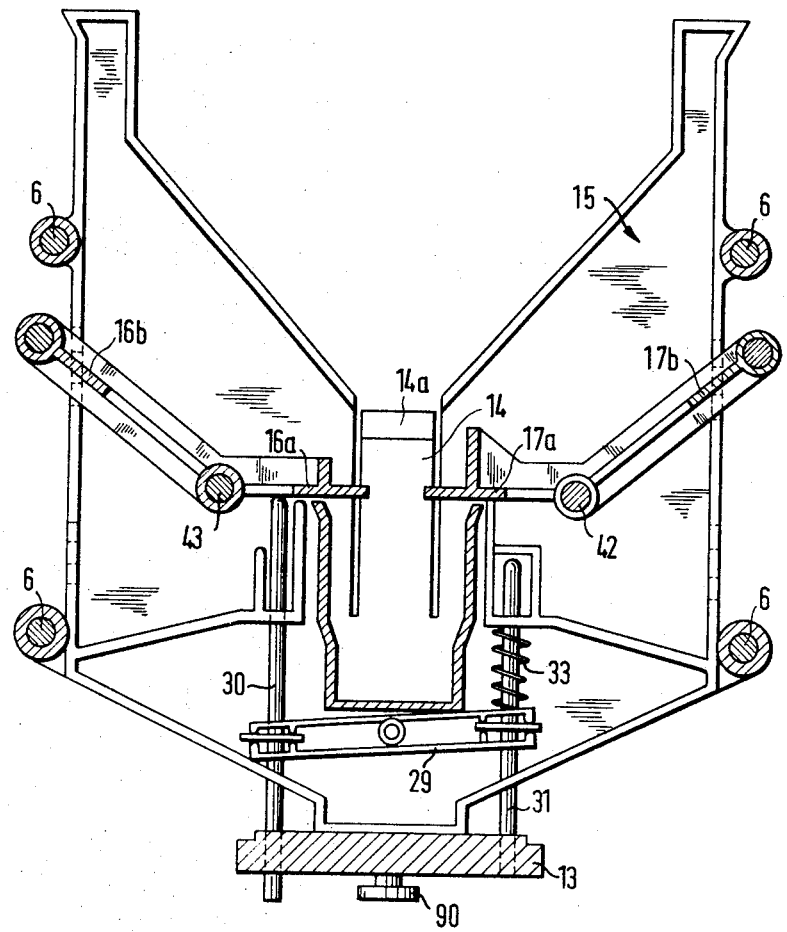
FIG. 6 shows a modification of the magazine shown in FIGS. 4 and 5.

The form of construction of the magazines shown in FIGS. 6 and 7 is provided with a mechanism which scans the adjustment of the film holder. Only one such mechanism is provided in each magazine, preferably in its bottom half. The mechanism acts as a container-type indicating means and comprises two slidably mounted pins 30 and 31 coupled together by a rocker 29. A compression spring 33 is mounted on the pin 31 and biasses the rocker mechanism in a clockwise direction. One end of the pin 30 is in the rocking path of arm 16a of the lever 16. Pin 30 is pushed by arm 16a so that its opposite end projects through an opening in the magazine plate 13 as shown in FIGS. 6 and 7. When the lever arm 16a rocks outwards, the action of the compression spring 33 causes the pin 31 to be pushed through an opening in the magazine plate 13 and the pin 30 to be simultaneously retracted. Thus when the pin 30 projects from the magazine plate 13 this indicates that the magazine has been adjusted to accommodate type 135 film cartridges, or contains only such film cartridges, while when the pin 31 projects it shows that the holder is adjusted to or filled with type 126 film cassettes.

Referring to FIG. 7, the guideways 3a – 3f of the turret 1 are provided with two electrical switches 32 and 34, of which the actuator 32a of one of the switches (32) is situated in the insertion groove of the pin 30 while the actuator 34a of the other switch (34) is situated in the insertion groove of the pin 31. In addition, or alternatively, the turret 1 may be provided with blocking means which in a first position prevents the insertion of magazines when the pin 31 projects, and in a second position prevents the insertion of magazines when the pin 30 projects. Referring to FIG. 7, this blocking means is formed by a shaped disc 36 which has a contoured edge and which is mounted for rotation concentrically on the turret 1 between two different positions. In the position illustrated, the projections 360 of disc 36 block the insertion of magazines with the pin 31 projecting (type 126 film cassettes). Accordingly, the scale 27 of the magazine indicates the 135 film type.

The apparatus described operates as follows: The empty magazines 2 are taken out of the turret by the operator, the levers 16 and 17 are adjusted appropriately for insertion of the required type of film container and then filled with the film cassettes or film cartridges of the selected type for processing. To this end, the films are taken out of the order bag T. The order bag T is pushed on to the shelf provided for this purpose at the top of the unit 15 and the film cassette or cartridge 12, 12a which was contained therein is fixed in either the holder 39, or the holder formed by levers 16a and 17a, at the underside of the unit 15. After filling, th magazines 2 are pushed into the guideways 3a – 3f of the turret 1. The maazines in the passages 3b – 3f are in the waiting position and are freely slidable upwards by an operator at all times and can be changed during operation of the apparatus. The magazine which is situated in the passage 3a, the series of rollers 90 of which engage the wormwheel 24, is in the processing station and is shifted downwards stepwise by the wormwheel 24. The pitch of the teeth of the wormwheel is so selected that the magazine is stationary for a short time after each shifting step. During this standstill, a pincers-like gripper Z (FIG. 1) enters the compartment to be emptied formed between two structural units 15, engages the film cassette or cartridge retained therein, and withdraws it from the compartment. Immediately thereafter, a second gripper (not shown) draws the order bag T out of the compartment. As soon as the magazine has been completely emptied, and has reached its lowest point of axial travel it actuates a switch which so controls the wormwheel 24 that it changes its direction of rotation and transports the magazine back up at high speed. As soon as the magazine reaches its uppermost position, the wormwheel stops its rotary movement and returns to the original direction of rotation and normal speed of rotation. The magazine actuates a second switch when it reaches its normal position of rest and this switch initiates a rotation of the turret through 60°. The next magazine is then in the processing station and the described withdrawal of the film cassettes or film cartridges and bags recurs.

In the case of processing in a fully automatic laboratory, after being removed from the magazines the film cassettes or cartidges are opened by machine and the films contained therein are unwound, trimmed to length and stuck together. Since different mechanisms are required for opening film cassettes and cartridges and are actuated selectively in the latest fully automatic processing machines, it is advantageous to provide the individual magazines on the turret with control means which respectively switch the processing machine over to the film type adapted to the magazines. The container-type indicating mechanism 29, 30, 31, 33 shown in FIGS. 6 and 7 is used for this purpose, together with the switches 32 and 34 and the blocking disc 36. In a processing machine which cannot be automatically adjusted to the required film type, there is no need to provide the switches 32 and 34, since in that case it is sufficient for the turret to be adjustable so that only magazines containing films of the required type can be fitted on to the turret 1.

What is claimed is:

1. Apparatus for loading an automatic film processing unit, comprising:
    a rotatable turret formed with a plurality of axially extending guideways;
    a plurality of magazines, each adapted to be held in a respective one of said guideways for axial movement relative to the turret, and each magazine comprising a stack of compartments which are each adapted to hold a standard film container in a predetermined position;
    one or more processing stations adjacent the turret;
    drive means for stepwise rotation of the turret so that each guideway in turn and the magazine therein is in the or one of the processing stations at at least one angular position of the turret
    shifting means at the or each processing station for automatically engaging and stepwise shifting a magazine in that processing station axially relative to the turret so that successively each compartment of the magazine is adjacent a predetermined processing position; for removal of the film container and
    means for engaging and preventing axial movement of magazines which are not in the or one of the processing stations.

2. Apparatus as claimed in claim 1 wherein each magazine compartment comprises holding means selectively adjustable to only hold one or the other of a first and a second type of standard film containers, said first type of standard film container being a 126 type film cassette and said second type of standard film container being a 135 type film cartridge and wherein all of the holding means of the compartments of every one of the magazines are interconnected so that the holding means of the compartments can only either all hold a container of said first type or all hold a container of said second type.

3. Apparatus as claimed in claim 2 wherein the holding means of each compartment comprises locating means for holding a cassette of 126 type film, and a pair of rocking levers, one mounted on each side of the compartment, which levers can be rotated between a first position in which they co-operate to hold a cartridge of 135 type film and in which the levers block access to the locating means for 126 type film cassettes, and a second position in which the levers allow a 126 type film cassette to be positioned in the locating means.

4. Apparatus as claimed in claim 3 wherein the levers of each pair each have an arm projecting beyond the side of the magazine and like levers of all compartments of the magazine are interconnected by a rod joining their projecting arms.

5. Apparatus as claimed in claim 4 wherein the magazine compartments comprise further holding means for engaging about the take-up spool of a 126 type film cassette or a 135 type film cartridge respectively.

6. Apparatus as claimed in claim 5 wherein said further holding means comprise spring tongues.

7. Apparatus as claimed in claim 2 wherein each magazine comprises a container-type indicating means which is interconnected with the holding means of the magazine and set thereby in a first or second position in dependance on the type of film container the holding means have been adjusted to hold, and wherein the turret comprises blocking means adapted to co-operate with the container-type indicating means of each magazine, which blocking means is selectively settable in a first or second position respectively in which it blocks insertion of a magazine holding second or first types of containers respectively.

8. Apparatus as claimed in claim 7 wherein the container type indicating means comprises first and second members each movable to project out of the magazine to act as a stop, the members being so interconnected with each other and the holding means of the magazine that when all the holding means are set to receive the first or second type of film container respectively only the first or second member respectively projects from the magazine to act as a stop, and wherein the blocking means of the turret comprises a shaped disc mounted on the turret and rotatable between two positions, the disc being shaped so that in its first or second position respectively a magazine with a first or second member respectively projecting as a stop can be inserted in the guideway whereas a magazine with the second or first member respectively projecting as a stop is blocked from being inserted in the guideway.

9. Apparatus as claimed in claim 1 wherein each magazine compartment is formed with a shelf for placing an order and despatch bag for the film container.

10. Apparatus as claimed in claim 1 wherein each magazine is built up from a plurality of identical units which are constructed with a lower part for holding the standard film container and an upper shelf for carrying an order and despatch bag for the film container.

11. Apparatus as claimed in claim 10 wherein the shelf of each identical unit provides a lower closure surface for the film container holding part of the immediately adjacent upper identical unit.

12. Apparatus as claimed in claim 1 wherein said shifting means comprises a wormwheel and said magazines are formed with a plurality of aligned rollers for successive engagement by said wormwheel when shifting the magazine axially.

13. Apparatus as claimed in claim 1 wherein said means for engaging and preventing axial movement of magazines which are not in a processing station comprises a horizontal stationary support plate engageable with the lower end of each magazine, said support plate being provided with a cut-out portion in alignment with a processing station for permitting downward stepwise shifting through said cut-out portion of only that magazine which is aligned with the processing station for removal of the film containers from the compartments of the magazine.

* * * * *